(12) United States Patent
Singhal et al.

(10) Patent No.: US 10,776,036 B2
(45) Date of Patent: Sep. 15, 2020

(54) SYSTEM AND METHOD FOR EFFICIENT RESTORE

(71) Applicant: EMC IP Holding Company LLC, Hopkinton, MA (US)

(72) Inventors: Upanshu Singhal, Bangalore (IN); Pradeep Mittal, Karnal (IN); Kumari Priyanka, Bengaluru (IN); Shivakumar Kunnal Onkarappa, Bangalore (IN); Chakraveer Singh, Bangalore (IN); Archit Seth, Bangalore (IN); Rahul Bhardwaj, Udaipur (IN); Chandra Prakash, Bangalore (IN); Manish Sharma, Bangalore (IN); Akansha Purwar, Bangalore (IN); Lalita Dabburi, Bangalore (IN); Shilpa Mehta, Bangalore (IN); Shelesh Chopra, Bangalore (IN); Asif Khan, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 27 days.

(21) Appl. No.: 16/028,693

(22) Filed: Jul. 6, 2018

(65) Prior Publication Data
US 2020/0012432 A1    Jan. 9, 2020

(51) Int. Cl.
G06F 3/06 (2006.01)
G06F 11/14 (2006.01)
G06F 11/20 (2006.01)

(52) U.S. Cl.
CPC .............. *G06F 3/065* (2013.01); *G06F 3/067* (2013.01); *G06F 3/0619* (2013.01); *G06F 3/0664* (2013.01); *G06F 11/1469* (2013.01); *G06F 11/2023* (2013.01)

(58) Field of Classification Search
CPC ........ G06F 3/065; G06F 3/0619; G06F 3/067; G06F 3/0664
See application file for complete search history.

(56) References Cited

U.S. PATENT DOCUMENTS

| | | | |
|---|---|---|---|
| 9,977,704 B1* | 5/2018 | Chopra | G06F 11/0709 |
| 10,248,336 B1* | 4/2019 | Koujalagi | G06F 3/067 |
| 2009/0113109 A1* | 4/2009 | Nelson | G06F 11/203 |
| | | | 711/6 |
| 2014/0149695 A1* | 5/2014 | Zaslavsky | G06F 12/16 |
| | | | 711/162 |

* cited by examiner

*Primary Examiner* — Tasnima Matin
(74) *Attorney, Agent, or Firm* — Chamberlain, Hrdlicka, White, Williams & Aughtry

(57) ABSTRACT

An agent for managing virtual machines includes a persistent storage and a processor. The persistent storage stores backup/restoration policies. The processor identifies a virtual machine of the virtual machines that is likely to fail and, in response to identifying the virtual machine, identifies backup data associated with the identified virtual machine; instantiates a clone of the identified virtual machine using the identified backup; exposes the clone while the identified virtual machine is exposed; and hides the virtual machine after the clone is exposed.

19 Claims, 13 Drawing Sheets

SYSTEM AND METHOD FOR EFFICIENT RESTORE

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, an agent for managing virtual machines in accordance with one or more embodiments of the invention includes a persistent storage and a processor. The persistent storage stores backup/restoration policies. The processor identifies a virtual machine of the virtual machines that is likely to fail and, in response to identifying the virtual machine, identifies backup data associated with the identified virtual machine; instantiates a clone of the identified virtual machine using the identified backup; exposes the clone while the identified virtual machine is exposed; and hides the virtual machine after the clone is exposed.

In one aspect, a method for managing virtual machines in accordance with one or more embodiments of the invention includes identifying a virtual machine of the virtual machines that is likely to fail and, in response to identifying the virtual machine, identifying backup data associated with the identified virtual machine; instantiating a clone of the identified virtual machine using the identified backup; expose the clone while the identified virtual machine is exposed; and hiding the virtual machine after the clone is exposed.

In one aspect, a non-transitory computer readable medium in accordance with one or more embodiments of the invention includes computer readable program code, which when executed by a computer processor enables the computer processor to perform a method for managing virtual machines. The method includes identifying a virtual machine of the virtual machines that is likely to fail and, in response to identifying the virtual machine, identifying backup data associated with the identified virtual machine; instantiating a clone of the identified virtual machine using the identified backup; expose the clone while the identified virtual machine is exposed; and hiding the virtual machine after the clone is exposed.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing virtual machines. More specifically, the systems, devices, and methods may provide virtual machine restoration and/or cloning services to virtual machines executing on production hosts.

In one or more embodiments of the invention, the system instantiates a clone of a virtual machine after instability in the virtual machine is detected. By doing so, services to clients may be maintained while ensuring the future availability to provide the services by the system. In one or more embodiments of the invention, the system identifies the instability based on a multifactor analysis that takes into account historic behavior of the virtual machine as well as current behavior of a virtual machine within a distributed computing environment.

In one or more embodiments of the invention, the system instantiates clones of failing virtual machines in proxy hosts, i.e., unknown to the clients. Once instantiated, the clones may be migrated to respective production hosts. Doing so may distribute the computing resource load of instantiating the clones and, consequently, may reduce the likelihood of poor services being provided to clients while the clones are being instantiated.

In this manner, one or more embodiments of the invention may address the problem of overloaded components of a distributed system. As will be discussed in greater detail below, embodiments may address multiple, additional problems beyond that of batch backup failure in a distributed system.

Figure 1:
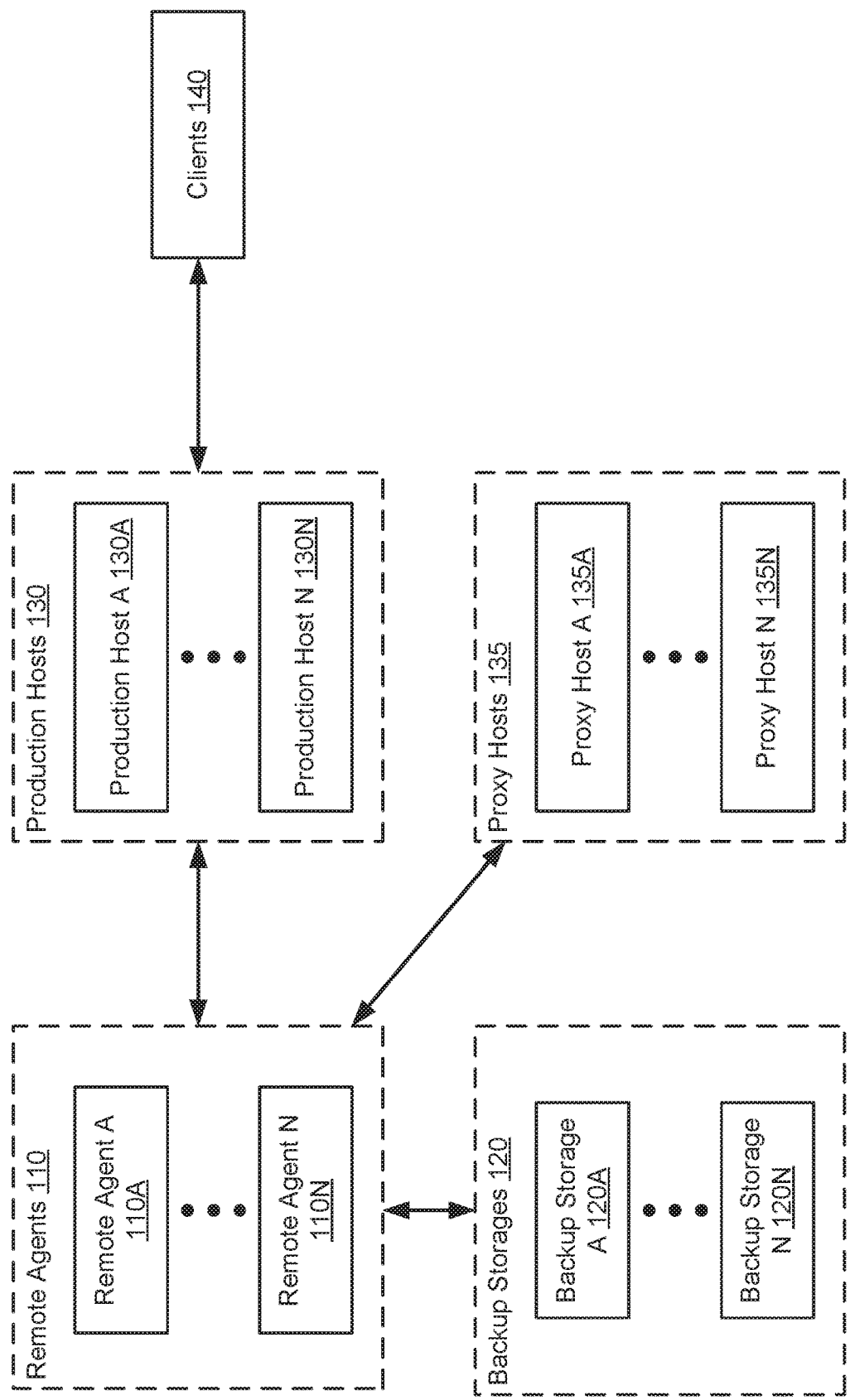
FIG. 1 shows a diagram of a system in accordance with one or more embodiments of the invention.

FIG. 1 shows an example system in accordance with one or more embodiments of the invention. The system may include production hosts (130) that host virtual machines exposed to clients (140). The system may also include proxy hosts (135) that are not exposed to the clients (140).

The system may further include remote agents (110) that provide services to the production hosts. The services may include data storage in backup storages (120) and restorations of virtual machines using the data stored in the backup storages (120). The remote agents may utilize the proxy hosts (135) when providing services to the production hosts (130). Each component of the system of FIG. 1 may be operably connected via any combination of wired and wireless connections. Each component of the system is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, See FIG. 8.

The clients (140) may interact with virtual machines hosted by the production hosts (130). For example, the virtual machines may host databases, email servers, or any other type of application. The clients (140) may utilize services provided by these or other applications. In another example, the clients (140) may directly operate the virtual machines, e.g., a virtualized environment. In such a scenario, the clients (140) may operate as terminals for accessing the virtual machines.

In one or more embodiments of the invention, the clients (140) may not interact with the proxy hosts (135). As will be discussed below in greater detail, the proxy hosts may not be exposed to the clients (140). By not being exposed, the clients (140) may not be aware of the existence of the proxy hosts (135).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 8.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host virtual machines. The production hosts (130) may host any number of virtual machines without departing from the invention. The production hosts (130) may also host agents, or other executing components, for orchestrating the operation of the hosted virtual machines. For additional details regarding the production hosts (130), See FIG. 2.

In one or more embodiments of the invention, the proxy hosts (135) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The proxy hosts (135) may be other types of computing devices without departing from the invention. For additional details regarding computing devices, See FIG. 8.

In one or more embodiments of the invention, the proxy hosts (135) are distributed computing devices. As used herein, a distributed computing device refers to functionality provided by a logical device that utilizes the computing resources of one or more separate and/or distinct computing devices. For example, in one or more embodiments of the invention, the proxy hosts (135) may be distributed devices that include components distributed across a number of separate and/or distinct computing devices. In such a scenario, the functionality of the proxy hosts (135) may be performed by multiple different computing devices without departing from the invention.

In one or more embodiments of the invention, the proxy hosts (135) host virtual machines that are not exposed to the clients (140). The proxy hosts (135) may host any number of virtual machines without departing from the invention. As will be discussed below in greater detail, the proxy hosts (135) may perform backup merges and virtual machine instantiations as part of restoring a virtual machine to a production host. The proxy hosts (135) may include similar components to that of the production host illustrated in FIG. 2. However, the proxy host and the virtual machines may not be exposed to the clients (140).

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 6A-6C. The remote agents (110) may be other types of computing devices without departing from the invention. For additional details regarding computing devices, See FIG. 8.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across a number of separate and/or distinct computing devices. In such a scenario, the functionality of the remote agents (110) may be performed by multiple different computing devices without departing from the invention.

In one or more embodiments of the invention, the remote agents (110) provide services to virtual machines. The services may include storing virtual machine data, generating backups of the virtual machines, and/or performing restorations of virtual machines.

In one or more embodiments of the invention, the remote agents (110) provide the aforementioned services by performing backup or restoration workflows. Doing so may generate a backup that is usable for restoration purposes or restore a virtual machine to a previous state, respectively. The steps in the aforementioned workflows may be governed by policies. Each workflow may include any number of steps. Different workflows may include different numbers and different types of steps.

In one or more embodiments of the invention, the backup and/or restoration workflows may modify configuration data of a virtual machine so that it may be cloned. The modification may be, for example, to change network identifiers of the virtual machines. By doing so, embodiments of the invention may enable any number of clones, i.e., copies of a virtual machine having modified configuration information to enable the copied virtual machine to execute within a network without conflicting with other copies of the virtual machine, of virtual machines to exist within a network environment.

In one or more embodiments of the invention, the remote agents (110) perform the modification of configuration data to backups of virtual machines stored in backup storage. Doing so may enable a virtual machine to be cloned without modifying its configuration data stored in backup storage.

In one or more embodiments of the invention, the remote agents (110) perform the modification of configuration data at the time of restoration. In other words, backup data for a virtual machine may be read from the backup storages (120), modified, and then used to perform a virtual machine restoration, i.e., generation of a clone.

Figure 3:
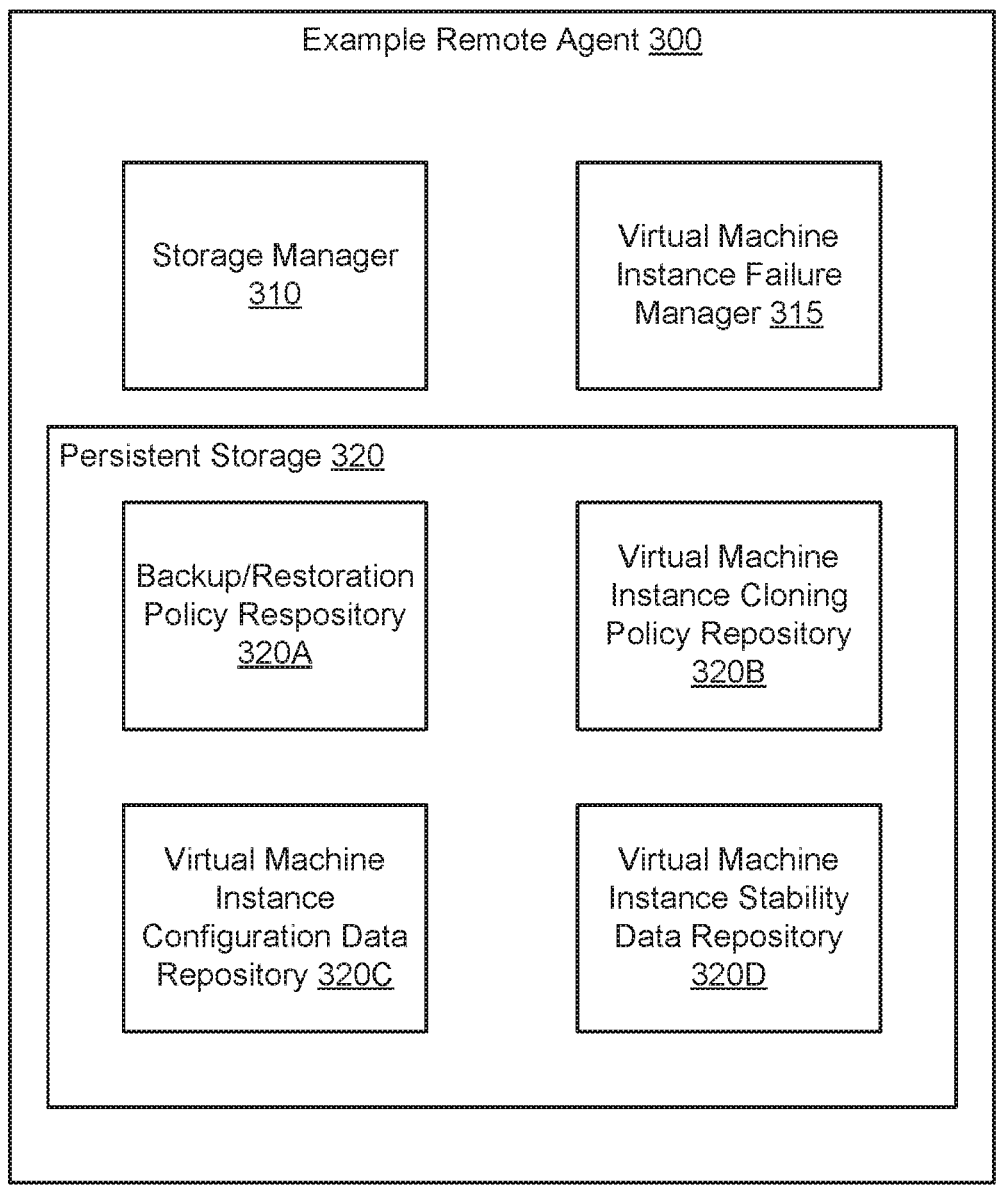
FIG. 3 shows a diagram of an example backup/restoration agent in accordance with one or more embodiments of the invention.

For additional details regarding remote agents (110), See FIG. 3.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 6A-6C. For additional details regarding computing devices, See FIG. 8.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, backups of virtual machines. In one or more embodiments of the invention, a backup of a virtual machine is a data structure that reflects a state of a virtual machine at a predetermined point in time or changes to a state over a period of time. For example, a backup of a virtual machine may be an image of the virtual machine, a differencing disk of the virtual machine, a log of an application executing on the virtual machine, or other types of data structures. An image of a virtual machine may include all of the virtual machine data at a point in time. A differencing disk may be the changes made to virtual machine data over a period of time. A log may be changes made to application data made over a period of time. The backup of a virtual machine may be other types of data structures that may be used to restore a virtual machine to a previous state without departing from the invention.

Multiple backups of varying types may be used to restore a virtual machine to a previous state. These multiple backups may be referred to as a continuity chain. Each backup of the continuity chain may be usable in combination with other members of the continuity chain for restoration purposes. For example, a virtual machine image may be used to restore a virtual machine to a state of the virtual machine at the time the image was generated. In another example, a virtual machine image and a differencing disk for a period of time immediately following the point in time associated with the image may be used to restore a virtual machine to a state of the virtual machine at the end of the period of time following the point in time.

In such a scenario, the virtual machine image and differencing disk may form a continuity chain. In one or more embodiments of the invention, a continuity chain is a number of backups that are each associated with different periods of time that form a continuous lineage, e.g., the periods of time associated with the backups cover a continuous portion of a timeline. For example, a first backup may be associated with May 12 and a second backup may be associated with May 13-May 17. Thus, the combination of the first backup and the second backup cover the period of May 12-May 17. The backups may be used to restore the virtual machine to any point in time between May 12 and May 17. The backup storages (120) may store additional or different data from backups of virtual machines without departing from the invention.

In one or more embodiments of the invention, the backup data for a virtual machine may include configuration data. The configuration data may include identifiers for the virtual machine within a network environment. As noted above, the configuration data may be modified when stored in a backup storage to be different from the configuration information of the virtual machine. By doing so, a clone of the virtual machine may be generated without modifying the backup data. In one or more embodiments of the invention, both modified and original configuration data are saved in the backup storage. Doing so may enable both clones of a virtual machine to be generated and a restoration of a virtual machine to be performed using the respective modified and original configuration data. For additional details regarding backup storages, See FIG. 4.

Figure 2:
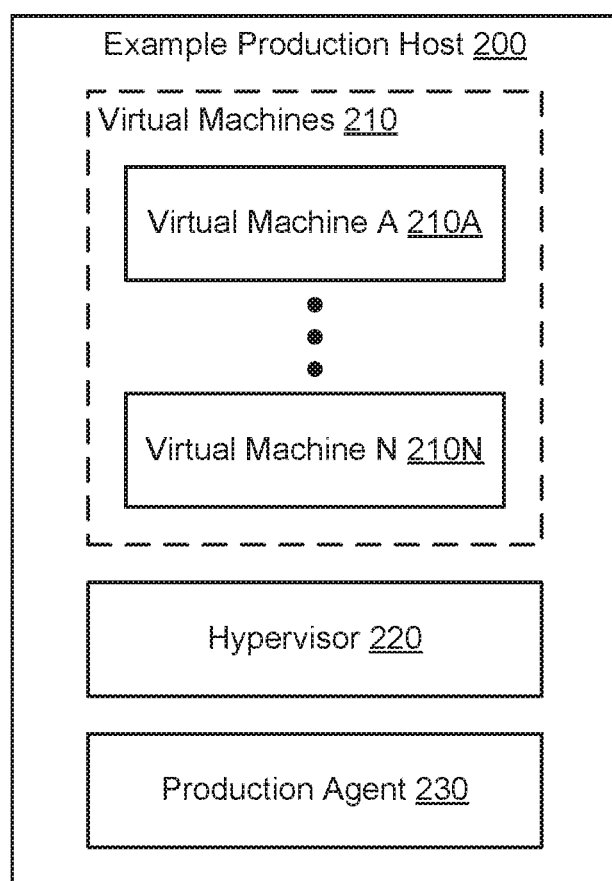
FIG. 2 shows a diagram of an example production host in accordance with one or more embodiments of the invention.

As discussed above, the backup storages may store data obtained from the production hosts (130). FIG. 2 shows a diagram of an example production host (200) in accordance with one or more embodiments of the invention.

In one or more embodiments of the invention, the example production host (200) hosts virtual machines (210). The example production hosts (200) may host any number of virtual machines (210A, 210N) without departing from the invention.

In one or more embodiments of the invention, the virtual machines (210) execute using computing resources of the example production host (200). For example, each of the virtual machines (210) may be allocated a portion of the processing resources, memory resources, and/or storage resources of the example production host (200).

In one or more embodiments of the invention, a portion of the virtual machines (210) may be clones of virtual machines. For example, multiple copies of a virtual machine, each with different configuration data, may be executing on the example production host (200). Any number of clones of virtual machines may be executing on any number of production host without departing from the invention.

In one or more embodiments of the invention, an image of each of the virtual machines (210) at points in time in the past may be stored, i.e., stored locally on a production host hosting the respective virtual machine. The stored image may include configuration information used by the virtual machine to identify itself within the network environment. Following the points in time in the past, a differencing disk that stores each of the changes made from the image of each of the virtual machines (210) may be stored. The aforementioned images and differencing disks may be stored locally or in a backup storage.

In one or more embodiments of the invention, logs associated with applications hosted by the virtual machines (210) may be generated. A log may reflect changes to application data. Logs may be used in combination with virtual machine images and/or differencing disks to restore virtual machines to predetermined states and/or applications to predetermined states.

In one or more embodiments of the invention, generating a backup of a virtual machine includes storing a copy of the image of the virtual machine that includes configuration information, a differencing disk, and/or a log of one or more applications hosted by the virtual machine in a backup storage. The stored data may also include modified configuration for clone generation purposes. Thus, when performing a restoration of a virtual machine or clone generation, the differencing disks and/or logs may be merged with a virtual machine image to obtain a representation of the virtual machine and/or application at the point in time following the periods of time reflected by each of the differencing disks and/or logs. The restored or cloned virtual machine may include unique configuration information and, thus, execute in a network environment without conflicting with other entities or components of the system of FIG. 1.

In one or more embodiments of the invention, the example production host (200) includes a hypervisor (220) that manages the execution of the virtual machines (210). The hypervisor (220) may instantiate and/or terminate any of the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The example production host (200) may include a production agent (230) that manages the storage of virtual machine data, e.g., images, differencing disks, and logs, in a backup storage. The production agent (230) may issue commands to the hypervisor (220) to control the operation of a virtual machine when attempting to store virtual machine data. For example, the production agent (230) may initiate the processes of generating a backup package, i.e., data that reflects a state of an entity and enables the entity to be restored to the state, for a virtual machine, an application, or other entity executing on the example production host (200). Similarly, the production agent (230) may initiate restorations of virtual machines, applications, or other entities.

In one or more embodiments of the invention, the production agent (230) may modify configuration information of a cloned virtual machine to prevent it from conflicting with other executing virtual machines, e.g., the virtual machine associated with the backup data on which the clone is based. For example, the production agent (230) may either (i) retrieve pre-modified configuration information from backup storage as opposed to original configuration information associated with a virtual machine or (ii) may modify original configuration information associated with a virtual machine. Other entities of the system of FIG. 1 may modify configuration information without departing from the invention.

In one or more embodiments of the invention, the production agent (230) is a hardened entity, i.e., not modifiable by an entity that is remote to a production host on which the production agent (230) is executing. The production agent (230) may have a set, finite number of predefined functions that may be invoked by a remote entity. In one or more embodiments of the invention, the production agent (230) is not configurable by modifying settings or associated configuration files via a remote terminal or other configuration utility.

In one or more embodiments of the invention, the production agent (230) is a hardware device including circuitry. The production agent (230) may be, for example, digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be hardware processor including circuitry such as, for example, a central processing unit or a microcontroller. The processor may be other types of hardware devices for processing digital information without departing from the invention.

When generating a backup or performing a restoration of a virtual machine, a remote agent may store or access data in a backup storage. FIG. 3 shows a diagram of an example remote agent (300) in accordance with one or more embodiments of the invention. The example remote agent (300) may orchestrate the performance of workflows for storing backups in backup storage, restoring virtual machines using data in backup storage, or instantiating clones of virtual machines using data in backup storage. To provide the aforementioned functionality, the example remote agent (300) may include a storage manager (310), a virtual machine instance failure manager (315), and a persistent storage (320). Each component of the example backup storage (400) is discussed below.

In one or more embodiments of the invention, the storage manager (310) is a hardware device including circuitry. The storage manager (310) may be, for example, digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be hardware processor including circuitry such as, for example, a central processing unit or a microcontroller. The processor may be other types of hardware devices for processing digital information without departing from the invention.

In one or more embodiments of the invention, the storage manager (310) orchestrates the generation and storage of backups in backup storage. The storage manager (310) may orchestrate the aforementioned process based on backup policies stored in a backup/restoration policy repository. The backup policies may specify the workflow for generation and storage of a backup.

In one or more embodiments of the invention, the storage manager (310) may modify the configuration information or add modified configuration to a generated backup for a virtual machine. As discussed above, doing so may enables clones of virtual machines to be generated. When storing backups, the storage manager (310) may store configuration information in accordance with virtual machine instance cloning policies stored in a repository (320B). When generating modified configuration information, the storage manager (310) may utilize virtual machine instance configuration information stored in a repository (320C) that reflects the configuration information of all virtual machines of the system of FIG. 1.

Figure 6A:
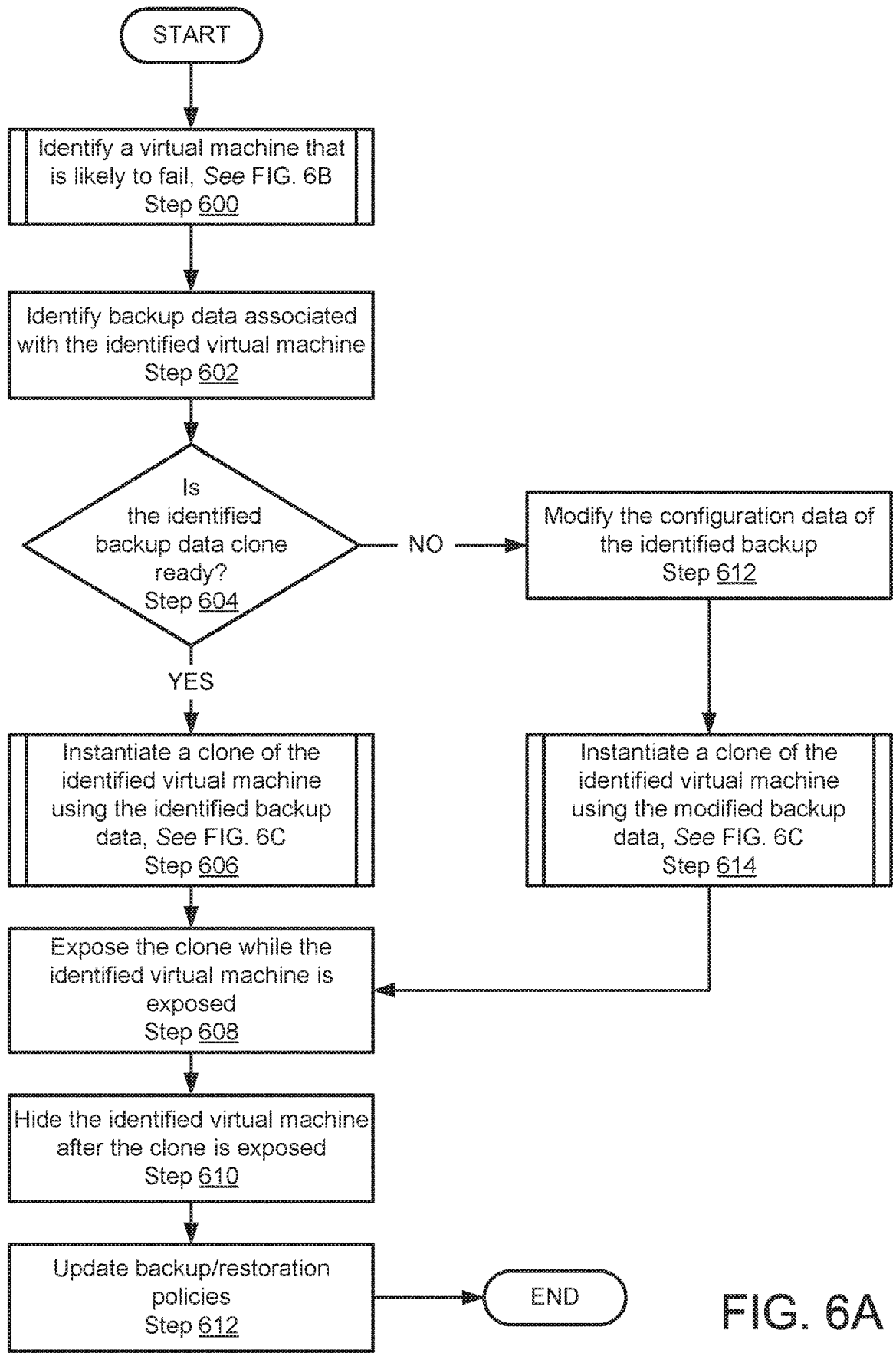
FIG. 6A shows a flowchart of a method of managing virtual machines in accordance with one or more embodiments of the invention.
Figure 6B:
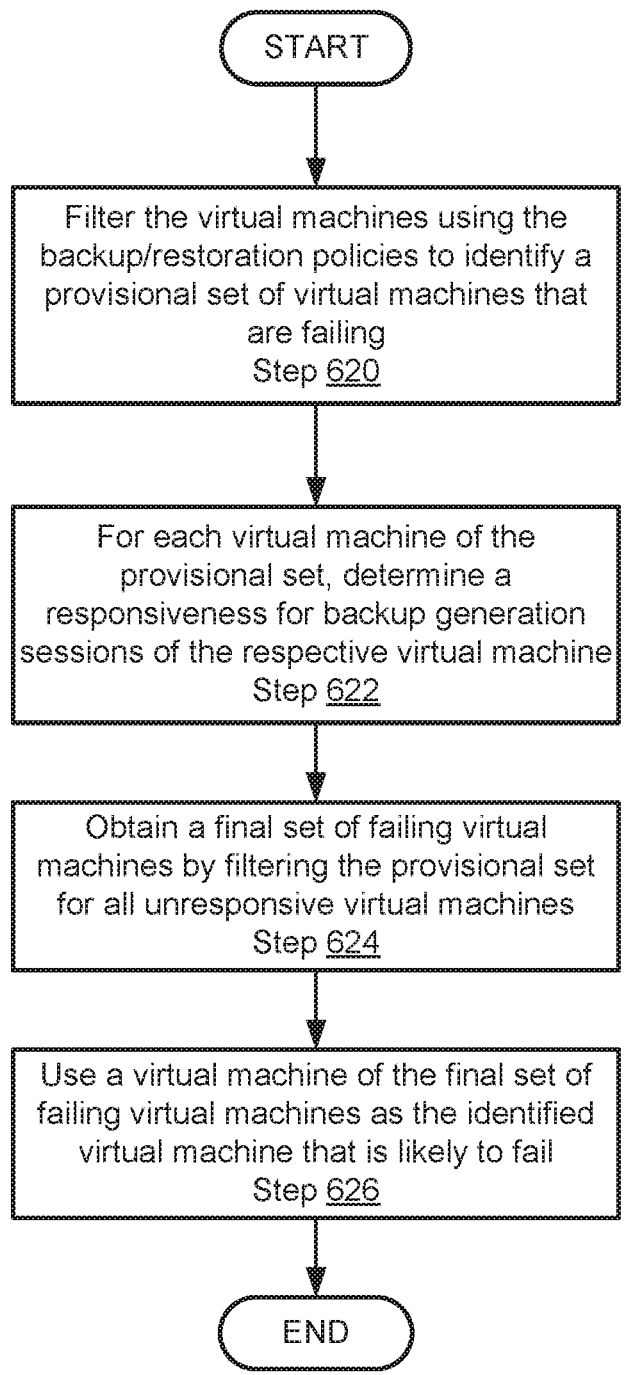
FIG. 6B shows a flowchart of a method of identifying a virtual machine that is likely to fail in accordance with one or more embodiments of the invention.
Figure 6C:
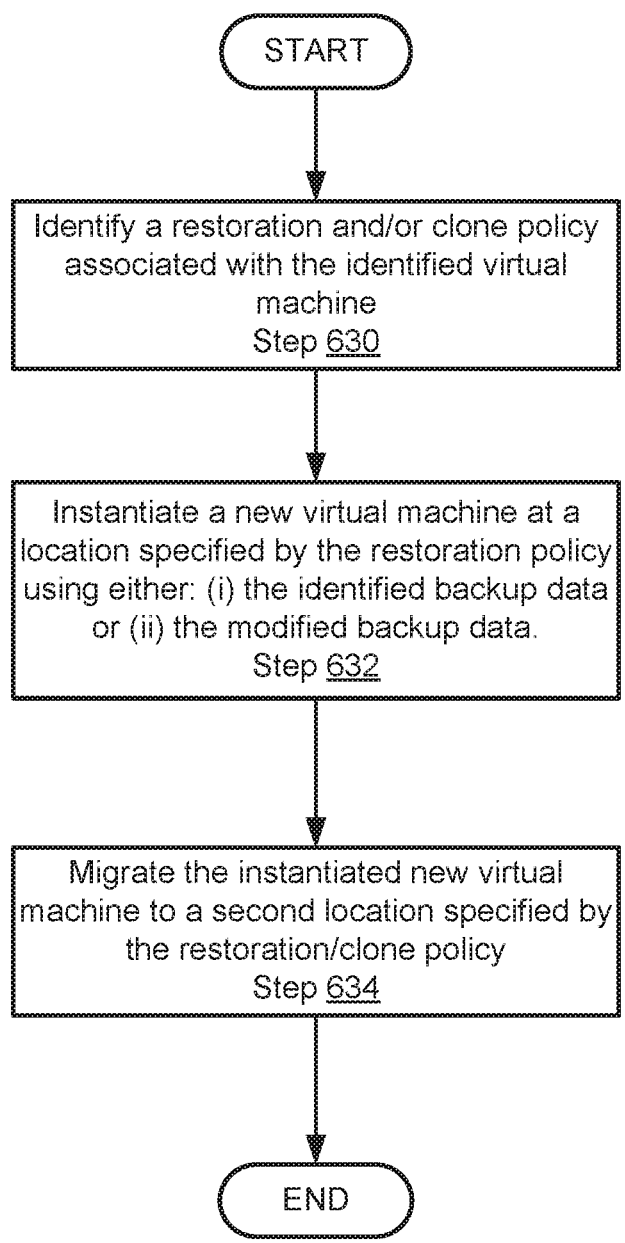
FIG. 6C shows a flowchart of a method of instantiating a close of a virtual machine in accordance with one or more embodiments of the invention.

To provide the aforementioned functionality, the storage manager (310) may perform all, or portion, of the methods illustrated in FIGS. 6A-6C.

In one or more embodiments of the invention, the virtual machine instance failure manager (315) is a hardware device including circuitry. The virtual machine instance failure manager (315) may be, for example, digital signal processor, a field programmable gate array, or an application specific integrated circuit. The virtual machine instance failure manager (315) may be other types of hardware devices without departing from the invention.

In one or more embodiments of the invention, the virtual machine instance failure manager (315) is implemented as computing code stored on a persistent storage that when executed by a processor performs the functionality of the virtual machine instance failure manager (315). The processor may be hardware processor including circuitry such as, for example, a central processing unit or a microcontroller. The processor may be other types of hardware devices for processing digital information without departing from the invention.

In one or more embodiments of the invention, the virtual machine instance failure manager (315) orchestrates the restoration of virtual machines and/or generation of clones of virtual machines. The virtual machine instance failure manager (315) may orchestrate the aforementioned process based on restoration policies stored in a backup/restoration policy repository. The restoration policies may specify the workflow for restoring a virtual machine. In a scenario where a clone is generated, a restoration policy may be used with the addition of steps to ensure that the configuration information of the instantiated clone is unique. Doing so may prevent conflicts between cloned virtual machines and other virtual machines on which the clones are based.

In one or more embodiments of the invention, the virtual machine instance failure manager (315) may modify the configuration information or use modified configuration when generating a clone. As discussed above, doing so may enables clones of virtual machines to be generated without conflicting with other virtual machines.

In one or more embodiments of the invention, the virtual machine instance failure manager (315) may automatically identify virtual machines that are prone to failure. When a virtual machine that is prone to failure is identified, the virtual machine instance failure manager (315) may automatically perform a restoration and/or generate a clone of the virtual machine. The virtual machine instance failure manager (315) may perform the identification using virtual machine instance stability data stored in a repository (320D). Doing so may reduce the likelihood of the functionality provided by the failing virtual machine from being unavailable.

To provide the aforementioned functionality, the virtual machine instance failure manager (315) may perform all, or portion, of the methods illustrated in FIGS. 6A-6C.

In one or more embodiments of the invention, the persistent storage (320) is a storage device that stores data structures. The persistent storage (320) may be a physical or virtual device. For example, the persistent storage (320) may include solid state drives, hard disk drives, tape drives, and other components to provide data storage functionality. Alternatively, the persistent storage (320) may be a virtual device that utilizes the physical computing resources of other components to provide data storage functionality.

The data structures stored by the persistent storage (320) may include a backup/restoration policy repository (320A), a virtual machine instance cloning policy repository (320B), a virtual machine instance configuration data repository (320C), and a virtual machine instance stability data repository (320D). Each of the aforementioned data structures is discussed below.

The backup/restoration policy repository (320A) may specify workflows for backup, restoration, and/or cloning purposes. The workflows may specify the actions to be performed to generate a backup, restore a virtual machine, or generate a clone. In one or more embodiments of the invention, the backup/restoration policy repository (320A) includes policies that specify different workflows. Each of the policies may be associated with different virtual machines, different data, or other portions of the production hosts.

In one or more embodiments of the invention, a restoration policy and/or clone policy of the backup/restoration policy repository (320A) may specify when a virtual machine is exposed to the clients. The policy may specify that a clone is to be exposed before a failing virtual machine is proxy. By doing so, services provided by the failing virtual machine may be continued to be provided by the cloned virtual machine.

The virtual machine instance cloning policy repository (320B) may specify workflows for cloning purposes. The workflows may specify the actions to be performed to generating a clone. In one or more embodiments of the invention, the virtual machine instance cloning policy repository (320B) includes policies that specify different workflows. Each of the policies may be associated with different virtual machines executing on production hosts.

The virtual machine instance configuration data repository (320C) may include configuration data for virtual machines. The configuration data may include the identifiers used by virtual machines to identify themselves within the system of FIG. 1, or other systems. In one or more embodiments of the invention, the virtual machine instance configuration data repository (320C) includes configuration data for all virtual machines in a system. The virtual machine instance configuration data repository (320C) may provide an efficient way to identify whether configuration information of a backup may conflict with configuration data of an executing virtual machine. For additional details regarding this repository (320C), See FIG. 5.

The virtual machine instance stability data repository (320D) may include stability data for virtual machines. The stability data may include characteristics of a virtual machine that indicate its stability. In one or more embodiments of the invention, the virtual machine instance stability data repository (320D) includes stability data for each virtual machine in a system. The stability data may include, for example, whether the last attempt at generating a backup for a virtual machine was successful, whether the virtual machine is consuming a disproportionately large quantity of computing resources relative to other virtual machines, whether a generated backup for the virtual machine is usable, in conjunction with other backups, for restoration purposes, and/or whether the virtual machine is responsive to commands from a hypervisor or production agent. The stability data may include different, fewer, or other characteristics indicating the stability of virtual machines without departing from the invention.

Figure 4:
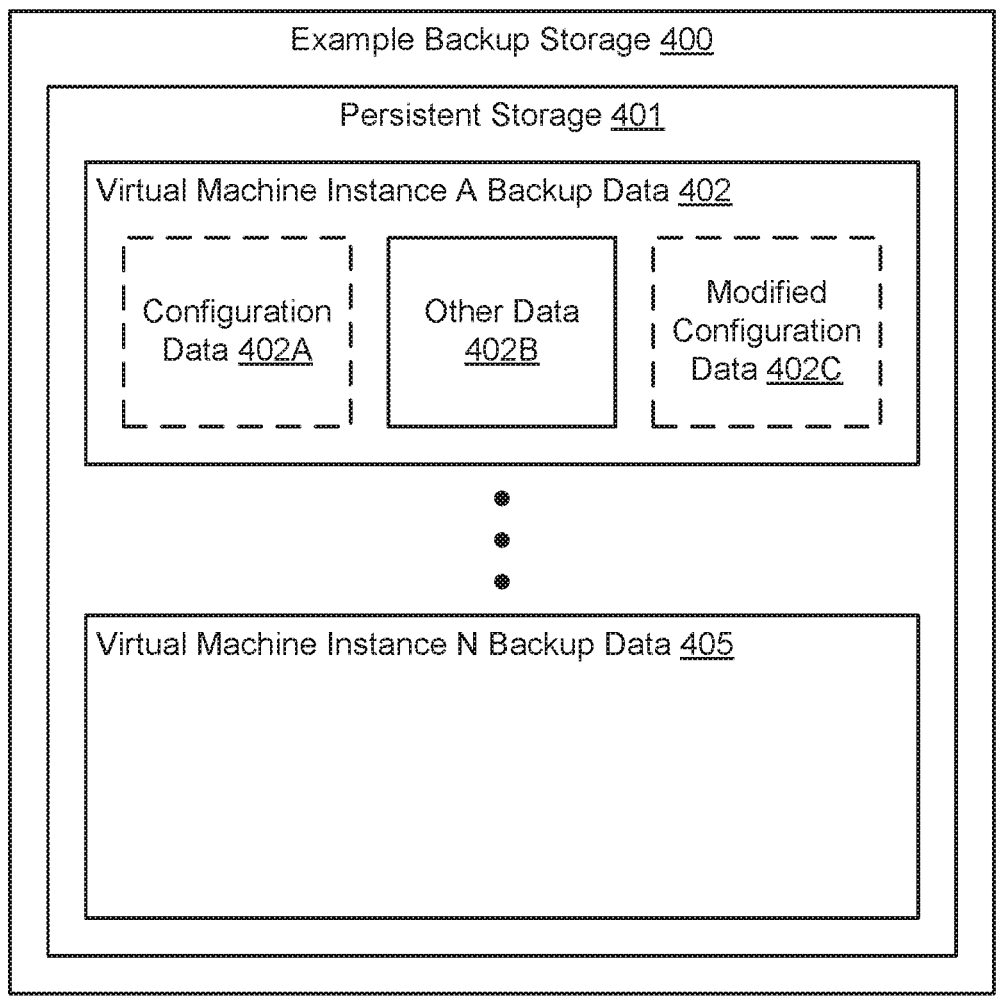
FIG. 4 shows a diagram of an example backup storage in accordance with one or more embodiments of the invention.

When generating a backup, performing a restoration, and/or generating a clone of a virtual machine, a remote agent may store or access data in a backup storage. FIG. 4 shows a diagram of an example backup storage (400) in accordance with one or more embodiments of the invention. The example backup storage (400) may store backup data including configuration information. To provide the aforementioned functionality, the example backup storage (400) may include a persistent storage (401).

In one or more embodiments of the invention, the persistent storage (401) is a storage device that stores data structures. The persistent storage (401) may be a physical or virtual device. For example, the persistent storage (401) may include solid state drives, hard disk drives, tape drives, and other components to provide data storage functionality. Alternatively, the persistent storage (401) may be a virtual device that utilizes the physical computing resources of other components to provide data storage functionality.

The data structures stored by the persistent storage (401) may include virtual machine instance backup data (e.g., 402, 405). The persistent storage (401) may include any number of such data structures. Each of the aforementioned data structures may be associated with a virtual machine of the system of FIG. 1.

In one or more embodiments of the invention, each virtual machine instance backup data (e.g., 402) includes other data (402B). The other data (402B) may be data that is representative of applications, application data, and/or other data of the virtual machine. The each virtual machine instance backup data (e.g., 402) may also include configuration data (402A) and/or modified configuration data (402C). The configuration data (402A) may include identifiers or other data that the virtual machine associated with the backup data (e.g., 402) uses to identify itself to other entities. The modified configuration data (402C) may include identifiers or other data that do not conflict with the identifiers or other data that the virtual machine associated with the backup data (e.g., 402) uses to identify itself to other entities. The identifiers or other data of the modified configuration data (402C) may also not conflict with the identifiers or other data that any other virtual machine uses for identification purposes. Each virtual machine instance backup data (e.g., 402) may include the configuration data (402A), the modified configuration data (402C), or both.

Figure 5:
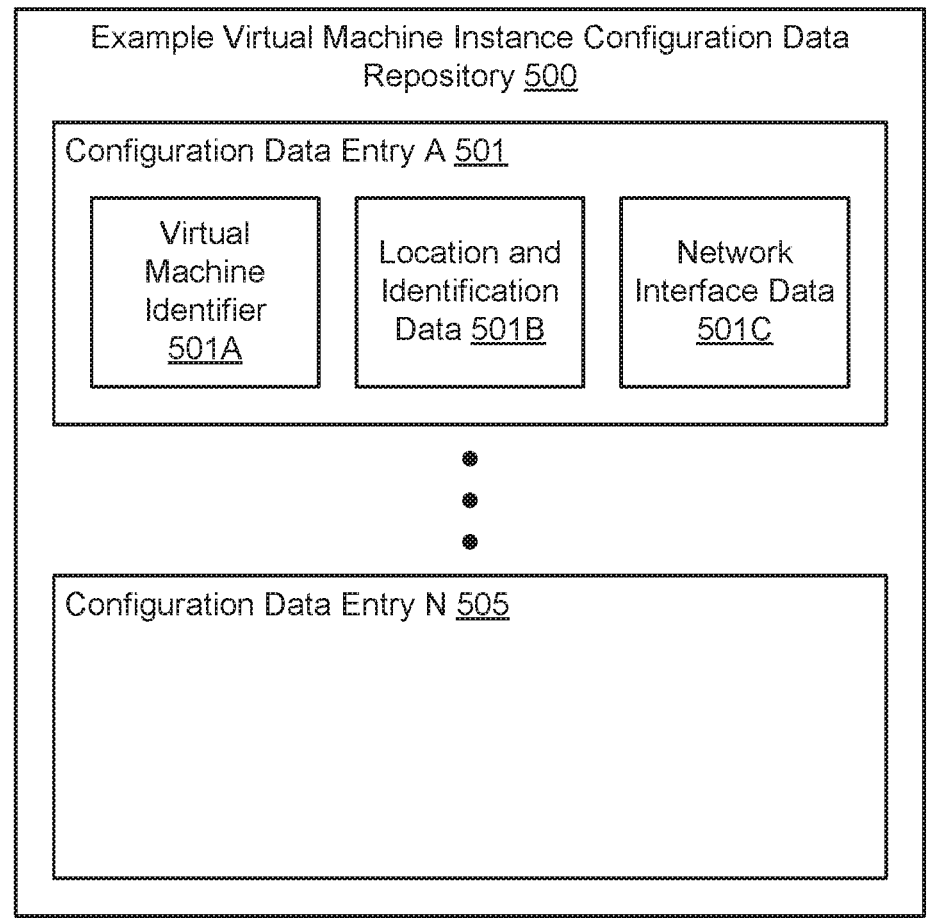
FIG. 5 shows a diagram of an example virtual machine instance configuration data repository in accordance with one or more embodiments of the invention.

To further clarify aspects of embodiments of the invention, a diagram of a data structure of the system of FIG. 1 is illustrated in FIG. 5. The data structure may be used when performing all or a portion of the methods illustrated in FIGS. 6A-6C.

FIG. 5 shows a diagram of an example virtual machine instance configuration repository (500) in accordance with one or more embodiments of the invention. The example virtual machine instance configuration repository (500) may specify the configuration information of virtual machines. The example virtual machine instance configuration repository (500) may include any number of configuration data entries (501, 505).

The each configuration data entry may include a virtual machine identifier (e.g., 501A), location and identification data (501B), and network interface data (501C). The virtual machine identifier may identify a virtual machine associated with the entry. The location and identification data (501B) may specify the location of the virtual machine within the network and may include the identification information that the virtual machine uses to identify itself. The network interface data (501C) may specify the parameters used by the virtual machine to access the network, e.g., a media access control address, internet protocol address, and/or other addresses or identification information that the virtual machine utilizes to interface with other components of the system of FIG. 1.

While illustrated as a list of entries, the example virtual machine instance configuration data repository (500) may be stored in other formats and may include addition, less, or different data without departing from the invention. Additionally, the repository (500) may be a shared resource, utilized by multiple remote agents, and located on other devices or across multiple devices, e.g., a data structure distributed across multiple computing devices, without departing from the invention.

As discussed above, components of the system of FIG. 1 may perform methods for managing virtual machines by generating backups, performing restoration, and/or generating clones, in addition to other functions. FIGS. 6A-6C show methods in accordance with one or more embodiments of the invention that may be performed by components of the system of FIG. 1.

FIG. 6A shows a flowchart of a method in accordance with one or more embodiments of the invention. The method depicted in FIG. 6A may be used to provide backup and/or restoration services in accordance with one or more embodiments of the invention. The method shown in FIG. 6A may be performed by, for example, a remote agent (e.g., 110, FIG. 1). Other components of the system illustrated in FIG. 1 may perform all, or a portion, of the method of FIG. 6A without departing from the invention.

In Step 600, a virtual machine that is likely to fail is identified.

In one or more embodiments of the invention, the virtual machine is identified using virtual machine instance stability data in a repository. For example, the repository may be searched to identify virtual machines for which a last backup session failed. One of virtual machines having a failed last backup session may be identified as the virtual machine that is likely to fail.

In one or more embodiments of the invention, the virtual machine is identified via the method illustrated in FIG. 6B. Other methods for identifying the virtual machine that is likely to fail may be used without departing from the invention.

In Step 602, backup data associated with the identified virtual machine is identified.

In one or more embodiments of the invention, the backup data is identified using policies stored in a backup/restoration policy repository. For example, an identifier of the identified virtual machine may be used to identify a policy in the repository. The policy may include identification information for the backup data. The backup data may be identified via other methods without departing from the invention.

In Step 604, it is determined whether the identified backup data is clone ready.

In one or more embodiments of the invention, the determination is made by comparing configuration data of the identified backup data to a repository storing copies of configuration data of all virtual machines in a system or a portion of virtual machines of the system. If the configuration data of the identified backup data is not duplicative of any configuration information in the repository, the backup data may be identified as clone ready. Otherwise, the data may be identified as not clone ready. Other methods of determining whether the backup data is clone ready may be used without departing from the invention.

In one or more embodiments of the invention, clone ready means that a new virtual machine may be instantiated using the configuration data of the identified backup data without conflicting with any other virtual machine.

If the identified backup data is clone ready, the method proceeds to Step 606. If the identified backup data is not clone ready, the method proceeds to Step 612.

In Step 606, a clone of the identified virtual machine is instantiated using the identified backup data.

In one or more embodiments of the invention, the clone is instantiated via the method illustrated in FIG. 6C. The clone may be instantiated using other methods without departing from the invention.

In one or more embodiments of the invention, the clone is instantiated at a location specified by a policy associated with the identified virtual machine. The policy may be a clone policy. The policy may be a restoration policy.

In Step 608, the clone is exposed while the identified virtual machine is exposed.

In one or more embodiments of the invention, the clone is exposed by migrating it to a production host that also hosts the identified virtual machine. The execution of the migrated clone may be initiated after migration.

In one or more embodiments of the invention, exposing the clone makes its existence known to clients. The clone's presence may be made know by, for example, network discovery protocols once the migrated clone begins execution.

In Step 610, the identified virtual machine is proxy after the clone is exposed.

In one or more embodiments of the invention, the identified virtual machine is proxy by suspending its execution. In one or more embodiments of the invention, prior to the suspension of execution of the identified virtual machine, a handover procedure between the identified virtual machine and the migrated clone may be performed. Doing so may alert clients that are using features of the identified virtual machine of the migrated clone and its capacity to perform similar functions.

In Step 612, backup and/or restoration policies associated with the identified virtual machine are updated.

In one or more embodiments of the invention, the policies are updated to reflect the identification information of the migrated clone virtual machine, rather than the identification information of the identified virtual machine.

The method may end following Step 612.

Returning to Step 604, the method may proceed to Step 612 follow Step 604 when the identified backup data is not clone ready.

In Step 612, the configuration data of the identified backup is modified.

In one or more embodiments of the invention, the configuration data is modified by performing a collision analysis. The collision analysis may be performed by generating new configuration data and comparing the generated new configuration data to the configuration data of all executing virtual machines. If the new configuration data does not match the configuration data of any executing virtual machine, the configuration of the identified backup data is modified to match the new configuration data. If the new configuration data does match, the processes is repeated until it does not match.

In Step 614, a clone of the identified virtual machine is instantiated using the modified backup data.

In one or more embodiments of the invention, the clone is instantiated via the method illustrated in FIG. 6C. The clone may be instantiated using other methods without departing from the invention.

Following Step 614, the method may proceed to Step 608 and eventually end following Step 612.

FIG. 6B shows a flowchart of a method in accordance with one or more embodiments of the invention. The method depicted in FIG. 6B may be used to identify a virtual machine that is likely to fail in accordance with one or more embodiments of the invention. The method shown in FIG. 6B may be performed by, for example, a remote agent (e.g., 110, FIG. 1). Other components of the system illustrated in FIG. 1 may perform all, or a portion, of the method of FIG. 6B without departing from the invention.

In Step 620, virtual machines are filtered using backup/restoration policies to identify a provisional set of virtual machines that are failing.

In one or more embodiments of the invention, the filtering is performed by identifying when the last backup for each virtual machine is identified. Backup storage may be checked to determine whether the last backup for each virtual machine was generated. Each virtual machine for which the last backup was not generated may be added to the provisional set.

In Step 622, for each virtual machine of the provisional set, a responsiveness for backup generation session is determined.

In one or more embodiments of the invention, the responsiveness of a virtual machine is determined by sending a backup generation request to a production agent of a production host that hosts the virtual machine. If the virtual machine responds to commands sent to it from the production agent, the virtual machine may determined to be responsive. If the virtual machine does not respond to commands sent to the production agent, the virtual machine may be determined to be unresponsive.

In Step 624, a final set of failing virtual machines is obtained by filtering the provisional set for all unresponsive virtual machines. In other words, the virtual machines of the provisional set that are determined as unresponsive in Step 622 maybe added to the final set.

In Step 626, a virtual machine of the final set of failing virtual machines is used as the identified virtual machine that is likely to fail.

In one or more embodiments of the invention, the virtual machine of the final set is randomly selected. Other methods of selecting the virtual machine from the final set may be used without departing from the invention.

The method may end following Step 626.

FIG. 6C shows a flowchart of a method in accordance with one or more embodiments of the invention. The method depicted in FIG. 6C may be used to instantiate a virtual machine in accordance with one or more embodiments of the invention. The method shown in FIG. 6C may be performed by, for example, a remote agent (e.g., 110, FIG. 1). Other components of the system illustrated in FIG. 1 may perform all, or a portion, of the method of FIG. 6C without departing from the invention.

In Step 630, a restoration policy or a clone policy associated with the identified virtual machine is identified.

The restoration/clone policy may be identified by matching identification information of the virtual machine to corresponding identification information stored as part of or associated with the policy.

In Step 632, a new virtual machine is instantiated at a location specified by the restoration/clone policy using either: (i) the identified backup data or (ii) the modified backup data.

If a restoration policy may be used, i.e., the configuration information included in the backup does not conflict with any executing virtual machines, then the identified backup data is used. If a clone policy is used, then the modified backup data may be used.

In one or more embodiments of the invention, the new virtual machine may be instantiated by transferring the backup data to a location specified by the restoration/clone policy. The location may be a proxy host. The location may be a production host. The backup data may be merged to generate a virtual machine image. The virtual machine image may be used to instantiate the virtual machine.

In Step 634, the instantiated new virtual machine is migrated to a second location specified by the restoration/clone policy.

In one or more embodiments of the invention, the instantiated new virtual machine is migrated is migrated by copying the virtual machine image to the second location. The virtual machine image may be deleted from the location specified by the restoration/clone policy.

The method may end following Step 634.

While the flowcharts of FIGS. 6A-6C are illustrated as sets of numbered steps, the steps may be performed in a different ordered, may be performed in parallel, steps may be omitted, and/or steps may be inserted without departing from the invention. For example, multiple virtual machines that are likely to fail may be addressed by performing method of FIG. 6A multiple times, one for each of the multiple virtual machines, in parallel. Similarly, any individual step may be broken down into sub-steps which may be parallelized, portions omitted, or performed in other orders without departing from the invention.

To further illustrate aspect of the invention, an example is provided in FIGS. 7A-7D. The example is non-limiting.

EXAMPLE

Figure 7A:
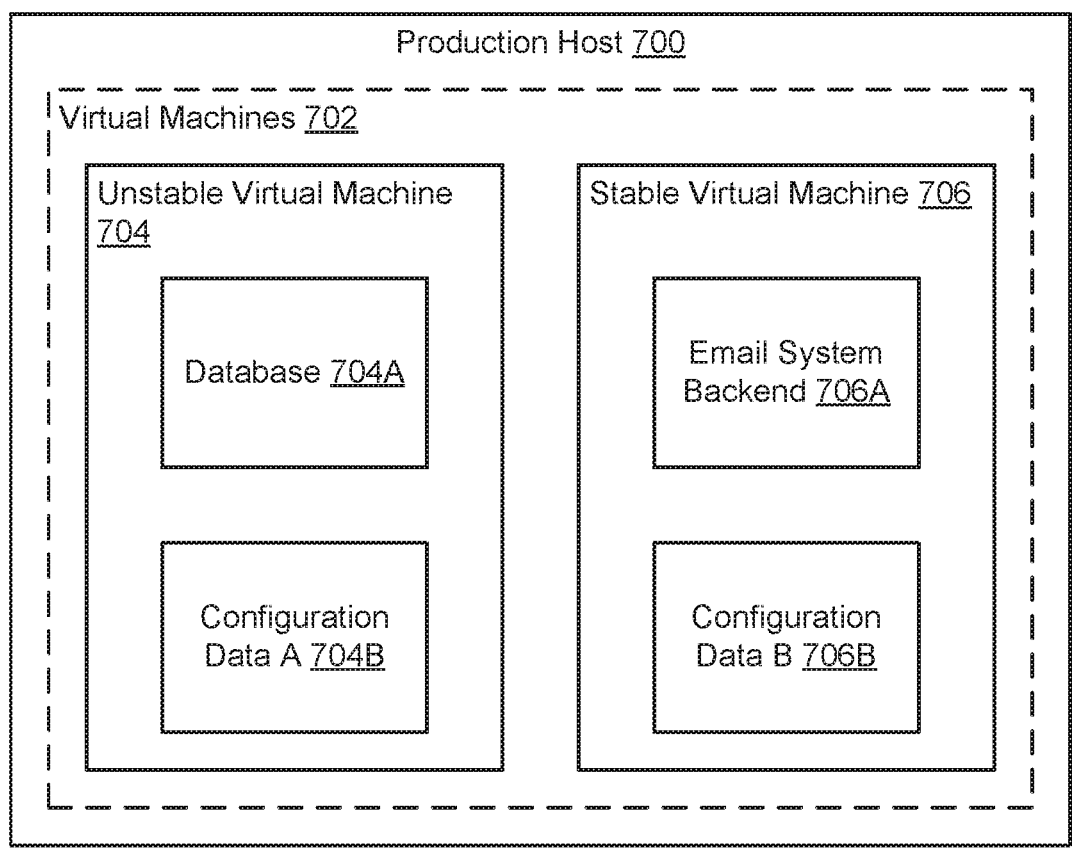
FIG. 7A shows a diagram of an example production host at a first point in time.

FIG. 7A shows a diagram of a production host (700) at a first point in time. The production host (700) hosts an unstable virtual machine (704) and a stable virtual machine (706). The unstable virtual machine (704) hosts a database (704A) and identifies itself using configuration data A (704B). The stable virtual machine (706) hosts an email system backend (706A) and identifies itself using configuration data B (706B).

Because a backup generation session for the unstable virtual machine (704) failed to store a backup in backup storage, a remote agent (not shown) identified that the unstable virtual machine (704) was unstable. In response to the identification, the remote agent performed the method of FIG. 6A and generated a clone of the unstable virtual machine (704).

Figure 7B:
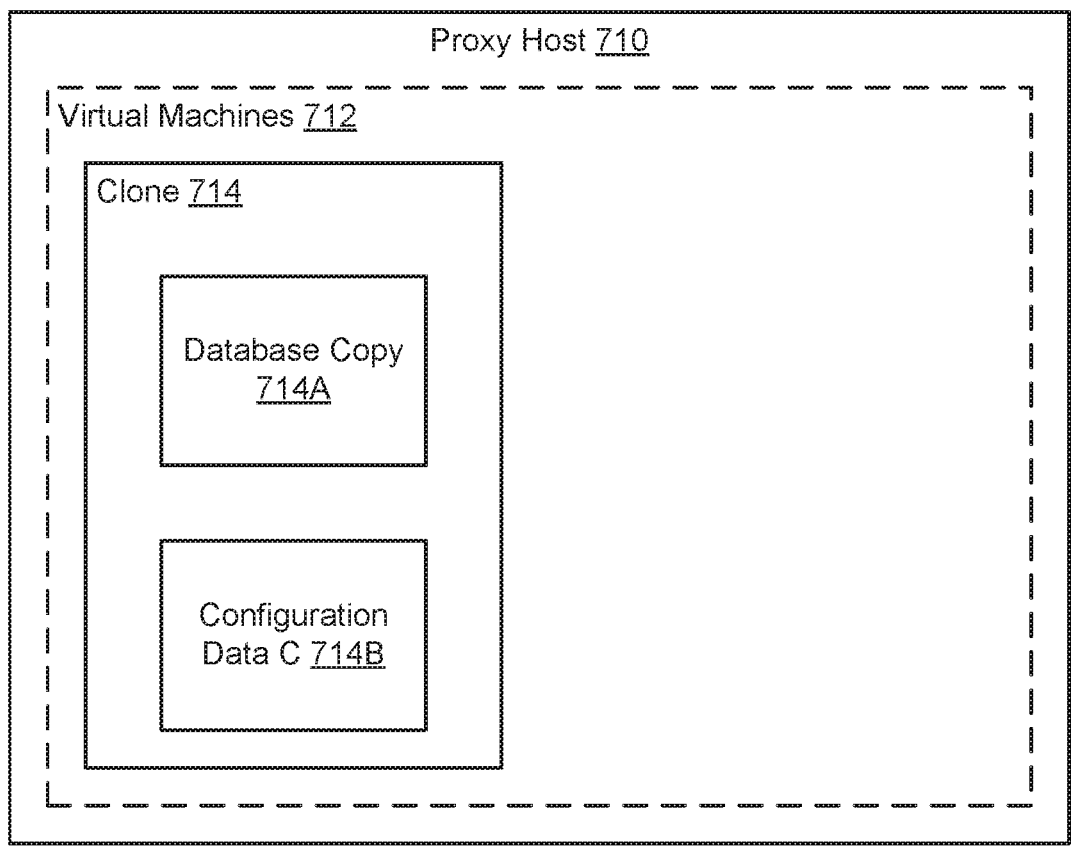
FIG. 7B shows a diagram of an example proxy host at a second point in time.

FIG. 7B shows a diagram of a proxy host (710). The proxy host (710) hosts that was generated there in accordance with a clone policy. To generate the clone (714), backup data associated with the unstable virtual machine was transferred from a backup storage to the proxy host (710). The proxy host (710) merged the backup data to obtain a virtual machine image including a database copy (714) and using configuration data C (714B) to identify itself to other entities and/or access network resources.

Figure 7C:
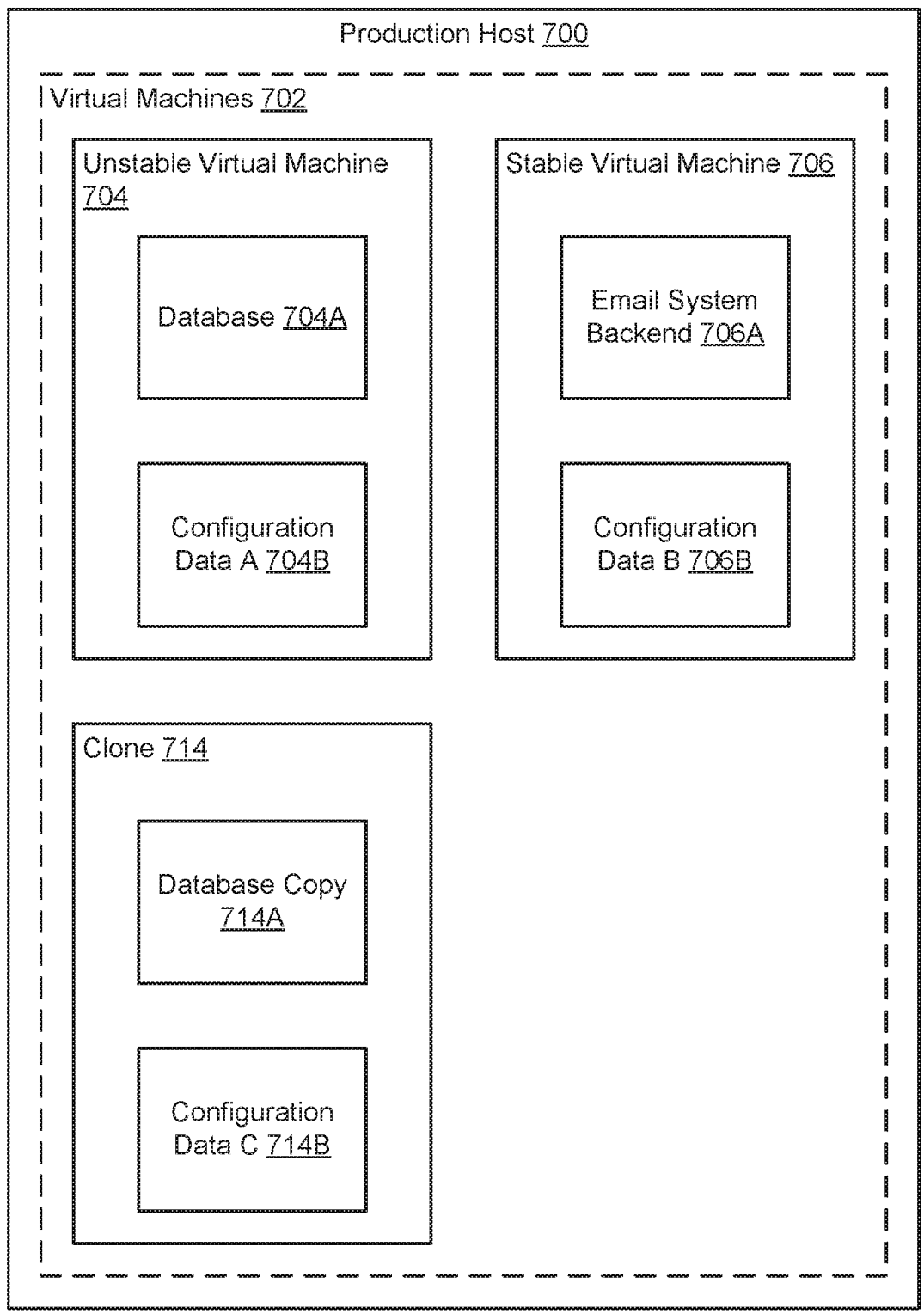
FIG. 7C shows a diagram of the example production host at a third point in time.

After generating the clone (714), the clone is migrated to the production host (700), as seen in FIG. 7C. FIG. 7C shows a diagram of the production host (700) after the clone is migrated. After migration, execution of the clone (714) is initiated to expose it to clients. After the clone (714) is exposed, the unstable virtual machine (704) is proxy from the client by suspending/terminating its execution.

Because the clone (714) and the unstable virtual machine (704) use different configuration data for identification and/or network access purposes, both may coexist without colliding with each other on the network.

Before suspending/terminating execution of the unstable virtual machine (704), clients (not shown) interacting with the unstable virtual machine may be notified of the presence of the clone (714) and thereby continue to receive database services from the clone both during and after suspension/termination of execution of the unstable virtual machine (704).

Figure 7D:
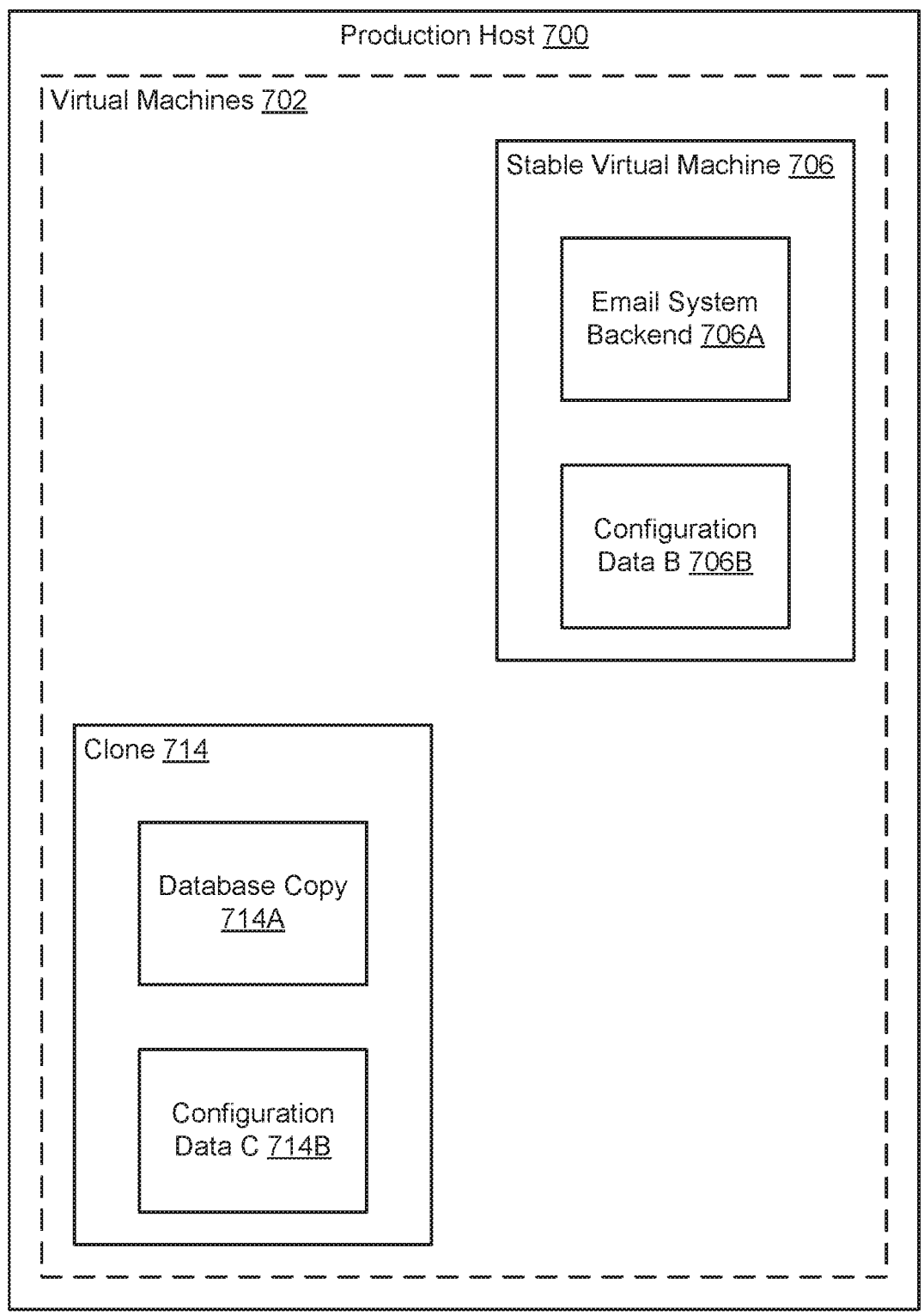
FIG. 7D shows a diagram of the example production host at a fourth point in time.

FIG. 7D shows a diagram of the production host (700) after termination of the unstable virtual machine (704). Because the clone (714) provides the same database services as the now-terminated virtual machine provided, the services were not interrupted from the view point of the clients.

End of Example

Figure 8:
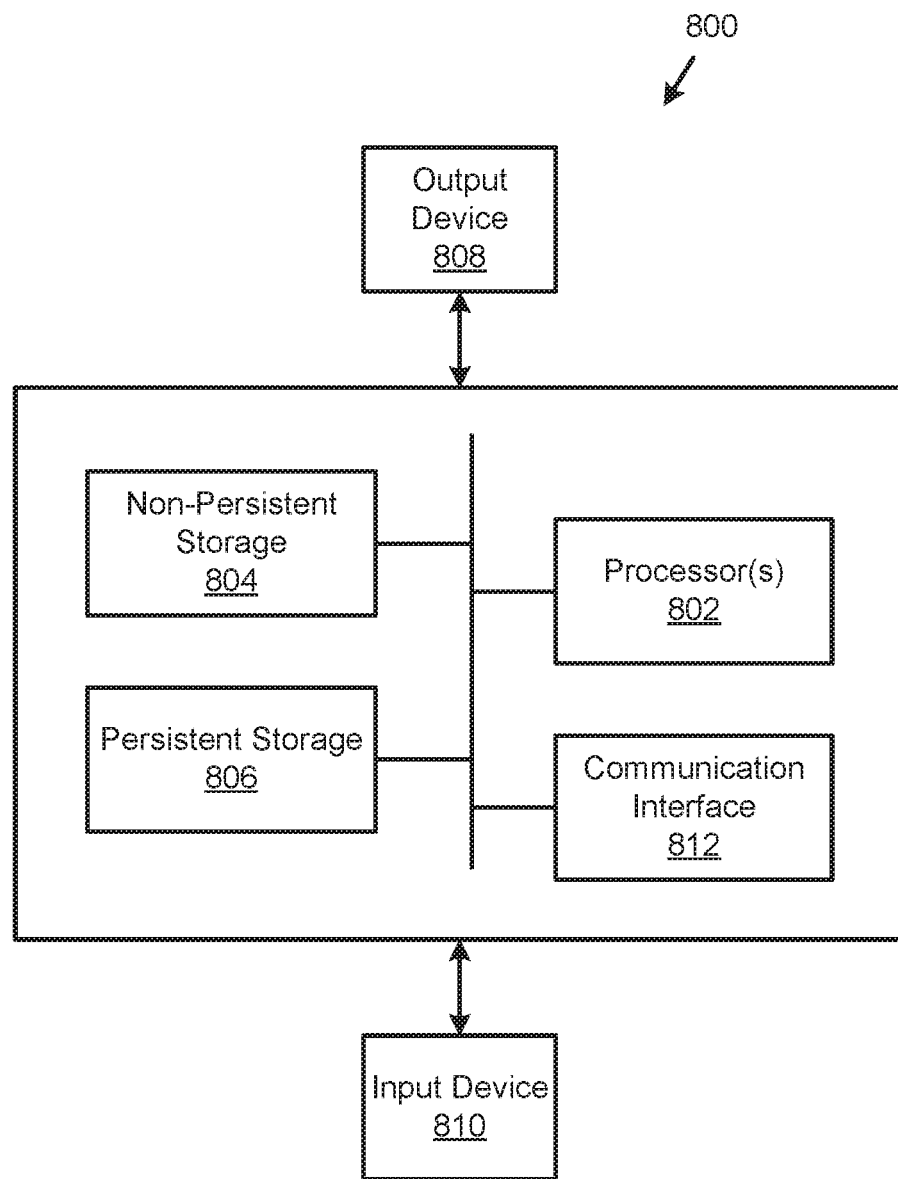
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

One or more embodiments of the invention may provide an improved process of restoring a virtual machines. Embodiments of the invention may provide a system that restores virtual machines without interrupting services provided to clients by the virtual machines. A system in accordance with embodiments of the invention may provide such functionality by instantiating a clone having different configuration information from the configuration information of an executing virtual machine. By doing so, the two virtual machines may co-exist in a distributed computing environment without colliding with each other. Thus, embodiments of the invention provide an improved distributed computing environment that prevents or reduces the impact of failed components on the providing of services to clients. Doing so is particularly advantageous because such service interruptions appear to be phantom slowdowns or even service pauses without any diagnosable cause, because, the cause is remote from the user. For example, if a virtual machine must be terminated before it is restored, the services provided by that virtual machine would be interrupted during the processes of restoration. Restoration may be time consuming processes.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An agent for managing virtual machines, comprising:
   a persistent storage that stores backup/restoration policies; and
   a processor programmed to:
   identify a virtual machine of the virtual machines that is likely to fail;
   in response to identifying the virtual machine:
   identify backup data associated with the identified virtual machine;
   instantiate a clone of the identified virtual machine using the identified backup;
   expose the clone while the identified virtual machine is exposed; and
   hide the virtual machine after the clone is exposed;
   before instantiating the clone:
   make a determination that the backup data is not clone-ready based on configuration data of the backup data; and
   in response to the determination:
   perform a collision analysis to obtain collision free configuration data, and
   modify the configuration data based on the collision free configuration data.

2. The agent of claim 1, wherein the clone and the identified virtual machine comprise same application data.

3. The agent of claim 1, wherein the clone and the identified virtual machine comprise different configuration data.

4. The agent of claim 3, wherein the configuration data of the identified virtual machine comprises a first uniform resource identifier, the configuration data of the clone comprises a second uniform resource identifier, and the first uniform resource identifier is different from the second uniform resource identifier.

5. The agent of claim 3, wherein the configuration data of the identified virtual machine comprises a first media access control address, the configuration data of the clone comprises a second media access control address, and the first media access control address is different from the second media access control address.

6. The agent of claim 3, wherein the configuration data of the identified virtual machine comprises a first internet protocol address, the configuration data of the clone comprises a second internet protocol address, and the first internet protocol address is different from the second internet protocol address.

7. The agent of claim 1, wherein identifying the virtual machine of the virtual machines that is likely to fail comprises:
filtering the virtual machines using the backup/restoration policies to identify a provisional set of virtual machines that are failing, wherein the backup/restoration policies indicate that a backup failure has occurred during each virtual machine's most recently scheduled backup session;
for each virtual machine of the provisional set, determining a responsiveness of the respective virtual machines to backup generation session requests;
obtaining a final set of failing virtual machines by filtering the provisional set for all non-responsive virtual machines using the determined responsiveness; and
selecting any virtual machine of the final set of failing virtual machines as the identified virtual machine that is likely to fail.

8. The agent of claim 1, wherein instantiating the clone of the identified virtual machine using the identified backup comprises:
identifying a restoration policy associated with the identified virtual machine;
instantiating a new virtual machine at a location specified by the identified restoration policy using the identified backup data; and
migrating the instantiated new virtual machine to a second location specified by the identified backup data.

9. The agent of claim 8, wherein the location is a proxy host.

10. The agent of claim 8, wherein the second location is a production host.

11. The agent of claim 8, wherein the identified virtual machine is at the second location.

12. The agent of claim 1, wherein exposing the clone commences execution of the clone.

13. The agent of claim 1, wherein hiding the identified virtual machine suspends execution of the identified virtual machine.

14. The agent of claim 1, wherein the processor is further programmed to:
after exposing the clone:
update the backup/restoration policies based on configuration data of the clone,
wherein the configuration data comprises an identifier selected from a group of identifiers consisting of a uniform resource identifier, a media access control address, and an internet protocol address.

15. The agent of claim 14, wherein updating the backup/restoration policies based on configuration information of the clone comprises:
identifying a backup policy associated with the identified virtual machine; and
updating a target identifier of the backup policy to reflect the configuration data.

16. A method for managing virtual machines, comprising:
identifying a virtual machine of the virtual machines that is likely to fail;
in response to identifying the virtual machine:
identifying backup data associated with the identified virtual machine;
instantiating a clone of the identified virtual machine using the identified backup;
exposing the clone while the identified virtual machine is exposed; and
hiding the virtual machine after the clone is exposed;
before instantiating the clone:
making a determination that the backup data is not clone-ready based on configuration data of the backup data; and
in response to the determination:
performing a collision analysis to obtain collision free configuration data, and
modifying the configuration data based on the collision free configuration data.

17. The method of claim 16, wherein instantiating a clone of the identified virtual machine using the identified backup comprises:
identifying a restoration policy associated with the identified virtual machine;
instantiating a new virtual machine at a location specified by the identified restoration policy using the identified backup data; and
migrating the instantiated new virtual machine to a second location specified by the identified backup data.

18. A non-transitory computer readable medium comprising computer readable program code, which when executed by a computer processor enables the computer processor to perform a method for managing virtual machines, the method comprising:
identifying a virtual machine of the virtual machines that is likely to fail;
in response to identifying the virtual machine:
identifying backup data associated with the identified virtual machine;
instantiating a clone of the identified virtual machine using the identified backup;
exposing the clone while the identified virtual machine is exposed;
hiding the virtual machine after the clone is exposed;
before instantiating the clone:
making a determination that the backup data is not clone-ready based on configuration data of the backup data; and
in response to the determination:
performing a collision analysis to obtain collision free configuration data, and
modify the configuration data based on the collision free configuration data.

19. The non-transitory computer readable medium of claim 18, wherein instantiating a clone of the identified virtual machine using the identified backup comprises:
identifying a restoration policy associated with the identified virtual machine;
instantiating a new virtual machine at a location specified by the identified restoration policy using the identified backup data; and
migrating the instantiated new virtual machine to a second location specified by the identified backup data.

* * * * *